3,637,649
WATER-SOLUBLE PHENYL AZONAPHTHYL-AZOPHENYL

Fritz Meininger, Frankfurt am Main, and Ludwig Schlafer, Sulzbach, Taunus, Germany, assignors to Farbwerke Hoechst Aktiengesellschaft vormals Meister Lucius & Brüning, Frankfurt am Main, Germany
No Drawing. Filed Nov. 13, 1968, Ser. No. 775,497
Claims priority, application Germany, Nov. 30, 1967, P 16 44 235.6
Int. Cl. C09b 31/04; D06p 1/06
U.S. Cl. 260—191                                1 Claim

ABSTRACT OF THE DISCLOSURE

The water-soluble disazo-dyestuff of the formula

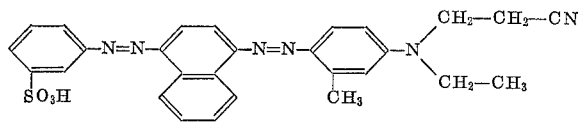

said dyestuff being suitable for the dyeing or printing of fibres, foils or fibres of wool, silk, polyamides, polyurethanes or leather, which dyeings are intense of a uniform Bordeaux red coloration and are very fast to light and to wet processing.

---

The present invention relates to a new and valuable water-soluble disazo dyestuff corresponding in the form of free acid to the formula

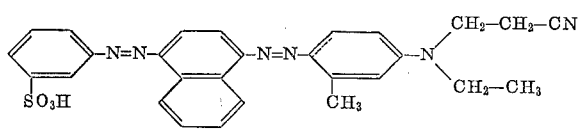

and a process for its preparation which comprises diazotizing aniline-3-sulfonic acid in known manner, coupling with α-naphthylamine and transforming the aminoazo dyestuff so formed by subsequent diazotization and coupling with N-ethyl-N-cyanoethyl-m-toluidine into a disazo dyestuff.

The dyestuff of the invention is valuable for the dyeing and printing of shaped structures such, for example, as films, sheets, knit fabrics or textiles on the basis of material of natural and/or synthetic origin containing carboxylic acid amide groups, for example, wool, silk, leather, polyurethanes or polyamides. The new dyestuff may be applied for said purpose according to dyeing and printing methods which are current in industry for acidic dyestuffs. It yields very intense dyeings of uniform Bordeaux red coloration which are very fast to light and wet processing.

In comparison with the dyestuffs described in British Pat. No. 441,072 having the most closely resembling structure, which have been developed for coloration of acetate rayon and for nitrocellulose lacquers the dyestuff of the invention is distinguished by better applicability in dyeing materials containing carboxylic acid amide groups. The new dyestuff is, for example, superior with regard to the stability to hydrolysis of the water-solubility-imparting group that prevents the precipitation of dyestuff in dyeing or printing.

The following example is to illustrate the invention but is not intended to limit it thereto, the parts and percentages being by weight unless otherwise stated.

EXAMPLE 87 parts of aniline-3-sulfonic acid were dissolved in 50 parts by volume of concentrated sodium hydroxide solution and 1000 parts by volume of water. The solution was cooled by addition of 300 parts of ice to the temperature required. After mixing with 140 parts by volume of concentrated hydrochloric acid and 87 parts of sodium nitrite solution of 40% strength, the whole was stirred for one hour at a temperature below 10° C. Then 1,500 parts of ice were added as well as 77.5 parts of α-naphthylamine dissolved in 700 parts by volume of boiling water followed by 65 parts by volume of concentrated hydrochloric acid. The temperature at coupling ranged from 0 to 5° C. Then 125 parts by volume of concentrated sodium hydroxide solution were poured in within a few minutes. The final pH-value amounted to 4. After addition of 20% of sodium chloride the coupling mixture was stirred for several hours, rendered alkaline (phenophthalein) with another 70 parts by volume of concentrated sodium hydroxide solution and cooled to 0° C. After addition of 107 parts of a nitrite solution of 40% strength, 210 parts by volume of sulfuric acid of a 50%-concentration were rapidly added to the reaction mixture, the whole being subsequently stirred for several hours and the diazonium salt that had separated was isolated by suction-filtration.

The whole of the filter residue was suspended in 600 parts by volume of water and mixed with 300 parts of ice. Then 93.6 parts of N-ethyl-N-cyanoethyl-m-toluidine in 120 parts by volume of glacial acetic acid were added whereupon it was stirred for several hours. The precipitated dyestuff was separated by suction-filtration, washed with water and dried.

350 parts of dyestuff of 67% concentration were obtained.

What we claim is:
1. The water-soluble disazo-dyestuff of the formula

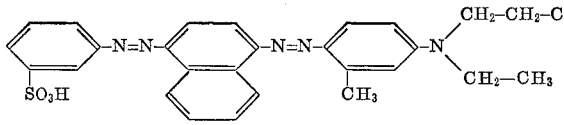

References Cited
UNITED STATES PATENTS

| | | | |
|---|---|---|---|
| 1,883,325 | 10/1932 | Baddiley et al. | 260—191 |
| 2,044,082 | 6/1936 | Knight | 260—191 |
| 3,092,076 | 9/1937 | Knight | 260—191 |
| 3,096,140 | 7/1963 | Gaetani | 260—191 X |
| 3,267,089 | 8/1966 | Feeman | 260—191 |
| 3,293,240 | 12/1966 | Koike et al. | 260—191 X |
| 3,479,332 | 11/1969 | Jirou et al. | 260—191 X |
| 3,496,162 | 2/1970 | Groebke et al. | 260—191 X |

FLOYD D. HIGEL, Primary Examiner

U.S. Cl. X.R.

8—4, 13, 41 R, 41 B, 50; 117—138.8 R, 142, 143 R; 260—178, 185, 196